(12) United States Patent
O'Gorman et al.

(10) Patent No.: US 8,624,570 B2
(45) Date of Patent: Jan. 7, 2014

(54) DIGITALLY CONTROLLING A POWER CONVERTER

(75) Inventors: Patrick A. O'Gorman, Grayslake, IL (US); Dennis L. Stephens, Barrington, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 955 days.

(21) Appl. No.: 12/580,229

(22) Filed: Oct. 15, 2009

(65) Prior Publication Data

US 2011/0089928 A1 Apr. 21, 2011

(51) Int. Cl.
*H02M 3/157* (2006.01)

(52) U.S. Cl.
USPC .......................................... 323/283; 323/351

(58) Field of Classification Search
USPC ........................ 323/241, 282–285, 322, 351
See application file for complete search history.

(56) References Cited

U.S. PATENT DOCUMENTS

| | | | |
|---|---|---|---|
| 4,988,935 A | 1/1991 | York | |
| 5,079,549 A | 1/1992 | Liessner | |
| 5,249,116 A | 9/1993 | Cloetens | |
| 5,790,607 A * | 8/1998 | Burke et al. | 375/355 |
| 5,856,920 A * | 1/1999 | Buda et al. | 363/149 |
| 6,396,725 B1 | 5/2002 | Jacobs et al. | |
| 6,944,229 B2 * | 9/2005 | Son et al. | 375/240.25 |
| 7,030,596 B1 * | 4/2006 | Salerno et al. | 323/282 |
| 7,212,061 B2 * | 5/2007 | Leung et al. | 327/380 |
| 7,956,592 B2 * | 6/2011 | Morroni et al. | 323/283 |
| 8,143,874 B2 * | 3/2012 | Templeton | 323/283 |
| 2001/0030999 A1 | 10/2001 | Moizio et al. | |
| 2004/0165661 A1 | 8/2004 | Braun | |
| 2005/0116698 A1 | 6/2005 | Prinz et al. | |
| 2005/0140532 A1 | 6/2005 | Rubin et al. | |
| 2006/0083037 A1 | 4/2006 | Leung et al. | |
| 2006/0227860 A1 | 10/2006 | Leung et al. | |
| 2007/0231692 A1 | 10/2007 | Kato et al. | |
| 2008/0136368 A1 * | 6/2008 | Hajiaghajhani | 320/106 |
| 2008/0252277 A1 | 10/2008 | Sase et al. | |
| 2009/0079401 A1 | 3/2009 | Mok et al. | |

* cited by examiner

*Primary Examiner* — Jessica Han (57) ABSTRACT

Methods and systems for power conversion are disclosed, including receiving at least one interrupt indicative of a transient power condition of the power converter and switching the processor to operate in a second mode from a first mode responsive to the interrupt. The switching enables the processor to allocate greater resources to process a power output parameter of the power converter operating in the transient power condition compared to resources allocated by the processor operating in the first mode to process the power output parameter.

18 Claims, 7 Drawing Sheets

DIGITALLY CONTROLLING A POWER CONVERTER

I. BACKGROUND

The invention relates generally to the field of controlling power supplies and power conversion.

II. SUMMARY

In one respect, disclosed is an apparatus for power conversion, the apparatus comprising: a processor; and logic instructions on tangible computer readable media and executable by the processor to cause the processor to perform: receiving at least one interrupt indicative of a transient power condition of the power converter; switching the processor to operate in a second mode from a first mode responsive to the interrupt, the switching enabling the processor to allocate greater resources to process a power output parameter of the power converter operating in the transient power condition compared to resources allocated by the processor operating in the first mode to process the power output parameter.

In another respect, disclosed is a method for power conversion, the method comprising: detecting a transient power condition in a power converter providing the power conversion, the power converter being configured to digitally process a power output parameter of the power converter; and switching the power converter to operate in a second mode from a first mode in response to the transient power condition, the power converter being configured to allocate greater resources to process the power output parameter associated with the transient power condition compared to resources allocated by the power converter operating in the first mode to process the power output parameter.

In yet another respect, disclosed is a computer program product for power conversion, the computer program product being embodied on a computer operable media, the computer program product comprising logic instructions effective to: detect a transient power condition in a power converter providing the power conversion by digitally controlling a power output parameter of the power converter; and switch the power converter to operate in a second mode from a first mode in response to the transient power condition, thereby allocating greater resources to control the power output parameter associated with the transient power condition compared to resources allocated in the first mode to process the power output parameter.

Numerous additional embodiments are also possible.

III. BRIEF DESCRIPTION OF THE DRAWINGS

Other objects and advantages of the invention may become apparent upon reading the detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

IV. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. The functionality of various circuits, devices or components described herein may be implemented as hardware (including discrete components, integrated circuits and systems-on-a-chip), firmware (including application specific integrated circuits and programmable chips), software or a combination thereof, depending on the application requirements. Upon reading this disclosure, many alternative embodiments of the present invention will be apparent to persons of ordinary skill in the art.

The following terminology may be useful in understanding the present disclosure. It is to be understood that the terminology described herein is for the purpose of description and should not be regarded as limiting.

System—One or more interdependent elements, components, modules, or devices that co-operate to perform one or more predefined functions.

Configuration—Describes a set up of elements, components, modules, devices, and/or a system, and refers to a process for setting, defining, or selecting hardware and/or software properties, parameters, or attributes associated with the elements, components, modules, devices, and/or the system. For example, a power converter may be configured to provide a 12 VDC output.

In some embodiments, digitally controlled power converters provide desired electrical power to loads such as a computer system or an electronic device, each having its own specification in terms of voltage, current, frequency, phase, quality, and other electrical parameters. A power converter (which may also be referred to as a power supply, a power regulator, a voltage regulator, a power conditioner, etc.) may typically refer to an electrical device that receives an input power signal having a first set of electrical properties and converts the signal to an output power signal having a second set of electrical properties. A direct current (DC) to DC (DC/DC) power converter is a power conversion device having both input and output signals that are DC. A digital controller such as a pulse width modulator (PWM) may be included in a digitally controlled power converter to control the output voltage at a desired set point by adjusting a duty cycle of an input voltage. Any changes in the power conversion inputs or outputs are adjusted by the digital controller to maintain the output voltage at the desired set point. Transient factors such as rapid changes in the load or input/output bus voltages may occur within a short period of time, and may cause the output voltage to increase or decrease rapidly beyond desired limits within the short time interval, thereby potentially causing harm to the load, the power converter or both. The specific time interval configured for the transient condition may be application and technology dependent and may typically vary from several microseconds to a few milliseconds.

In some embodiments, the digital controller used in the digitally controlled power converter may be configured to have sufficient compute power and bandwidth to process signals associated with the transient condition. That is, the digital processor which may be configured to perform multiple tasks such as monitoring of voltages and currents, communications tasks, monitoring of temperatures, and others during a normal mode of operation is configured to be able to respond in a fast enough manner to make a difference during the transient condition and thereby maintain the output voltage at the desired set point. To reduce costs, reduce power requirement, reduce area, and improve efficiency, the same digital processor is utilized to process (or control) signals associated with the normal operating mode as well as signals associated with the transient power condition in order to maintain the output voltage at the desired set point.

In some embodiments, a solution for detecting rapid changes in the output voltage of an improved power converter may deploy an analog circuit working in combination with a digital processor based controller. Specifically, the analog circuit may be configured to detect a rapid change in output voltage and send a signal to the processor in the controller that a large transient power change has occurred. An output current may not be measurable. However, increases in output current may be derived by measuring the output voltage at an output capacitor of the power converter. The improved combined analog/digital circuit has an extended bandwidth compared to the bandwidth of the traditional digital controller alone. The extended bandwidth enables the combined circuit to detect whether a slew rate of the output voltage exceeds a threshold value and trigger an interrupt signal to the digital processor in response to the transient power condition. The interrupt enables the digital processor to reallocate processing tasks by suspending lower priority tasks and effectively elevating processing tasks associated with the transient power condition. The digital processor is configured to scan the output voltage at a faster rate, e.g., 10× normal, to capture the changes occurring within a short period of time. Based on the scanned value of the output voltage at the faster scan rate, the digital processor may simply turn a pulse on or off (e.g., execute on/off or binary control) to control the output voltage at the desired set point. The duration of this pulse may depend on the slew rate of the output capacitor and circuit operating conditions. For example, the duration may be dependent on the duty cycle or load at the time of the load change, and consequent capacitor slew rate event.

In some embodiments, the analog circuit may be configured as a bandpass filter that allows signals indicative of the output voltage and having a frequency range adjacent to that of the controller to pass through, thereby extending a bandwidth of the improved combined circuit. In some applications two or more bandpass filters may be used to obtain desired bandwidth extension. One or more comparator circuits may be used to generate the interrupt signal sent to the processor if it is determined that a slew rate of the output voltage exceeds a reference threshold value. In some embodiments, two types of interrupt signals may be generated by two comparators to differentiate between a positive slew rate (e.g., when load is suddenly dropped and output voltage increases) and a negative slew rate (e.g., when load is suddenly increased and output voltage decreases).

In some embodiments, the interrupt may cause the processor to suspend normal operation of the digital closed loop control, enable fast scan of the output voltage and enable binary control of the output voltage. The improved technique may allow loop gain factors to be increased significantly (e.g., from 5 in normal mode to 75 in transient mode) without a loss in loop stability and without causing the output voltage to exceed set point by more than desired range.

Figure 1:
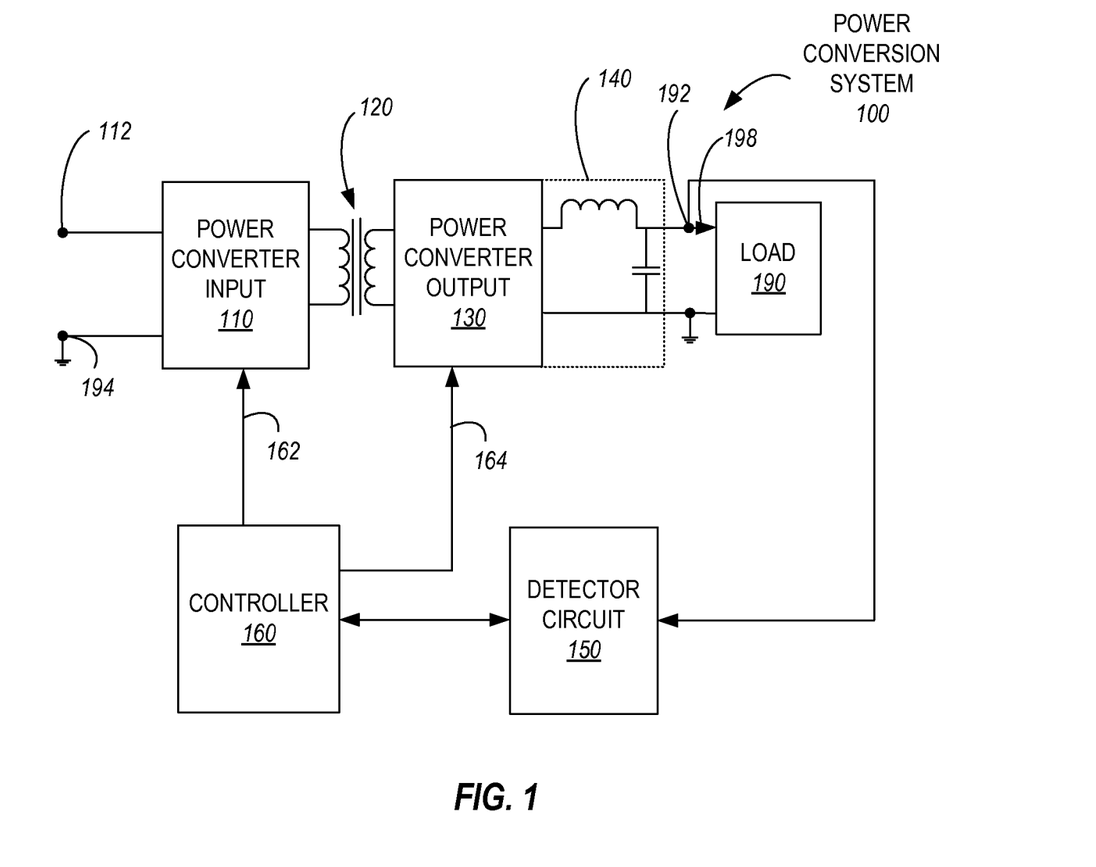
FIG. 1 is a block diagram illustrating a power conversion system, in accordance with some embodiments.

FIG. 1 is a block diagram illustrating a power conversion system, in accordance with some embodiments.

In some embodiments, the power conversion system 100 is configured to provide configurable power to a load 190 coupled between an output terminal 192 and a reference terminal 194 such as ground. The power conversion system 100 includes a power converter input circuit 110 coupled to receive an input signal across an input terminal 112 and the reference terminal 194, an optional transformer 120 having a primary side that is coupled to receive an output of the power converter input circuit 110 and a secondary side coupled to a power converter output circuit 130, a filter circuit 140 coupled to receive an input from the power converter output circuit 130 and provide a power output parameter 198 (configured to be one of voltage, current, phase, and frequency measurement) at the output terminal 192, a detector circuit 150 coupled to the output terminal 192, and a controller 160 coupled to receive an input from the detector circuit 150 and generate a control signal 162 provided to the power converter input circuit 110 for controlling the power output parameter 198. In some embodiments, another control signal 164 may be provided to the power converter output circuit 130 for controlling the power output parameter 198. In some embodiments, the control signals 162 and 164 may be the same. It is understood that although the power conversion system 100 is shown to include an optional transformer 120, the power conversion system may be configured to exclude the optional transformer 120, e.g., in DC/DC converter applications that are not transformer isolated.

In some embodiments, the power conversion system 100 is configured to operate in one of multiple operating modes (or states) including a first mode, e.g., normal mode, and a second mode, e.g., transient power mode. The multiple operating modes may also include a diagnostic mode, test mode, startup/shutdown mode, and others. When operating in the normal mode the controller 160 scans or samples the power output parameter 198 at a first frequency, e.g., 10 kilohertz, and performs closed loop digital control, e.g., PID control, by modulating a pulse width of the control signal 162 to maintain the power output parameter 198 at the desired set point. When operating in the transient power mode the controller 160 scans or samples the power output parameter 198 at a second frequency, e.g., 100 kilohertz, and performs binary digital control, e.g., on/off control, by asserting or deasserting the control signal 162 to maintain the power output parameter 198 at the desired set point. Thus, the second frequency may be configured to be sufficient (e.g., as defined by Nyquist criteria) to scan the values of the power output parameter 198 during the transient power condition, e.g., it may be configured to be 10× greater than the first frequency. A bandwidth of the power conversion system 100 operating in the normal mode may be limited due to a lower value of the first frequency, e.g., 10 kilohertz. This bandwidth may be insufficient to sample signals at the second frequency that may be required to process transient power condition signals. Switching to the transient switching mode may automatically extend the bandwidth of the power conversion system 100.

In some embodiments, the power specifications for some loads may require that the power output parameter 198 (such as the output voltage) be maintained within X% of a specified value and be independent of the operating mode of the power conversion system 100. For example, a manufacturer of a hybrid transportation vehicle (having an electric drive powered by one or more 12V rechargeable batteries) may require that the controller 160 is able to maintain the power output parameter 198 at 12 VDC or within 10% of its nominal value during normal and transient power condition. A transient power condition may be defined to occur when a power parameter changes by more than X% over a predefined short time period, e.g., when there is a 10% to 100% change in output current over a 100 microsecond time interval as a ramp function. It is understood that the particular values for X and the predefined short time period selected to define the transient power condition may depend on the application and the technology. Thus, the specific time interval for the transient condition may typically vary from several microseconds to few milliseconds.

In some embodiments, the controller 160 may be configured to perform tasks such as communications with other devices via a controller area network (CAN) bus (a well known communication standard used in the automotive/transportation industry) and monitoring of heat sink temperature in addition to performing sampling and control functions. The controller 160 may be configured to switch from operating in the normal mode to the transient mode in response to the detector circuit 150 detecting the transient power condition. The switching of the modes enables the controller 160 to allocate additional processing (or controller) resources to handle the transient power condition compared to the resources allocated to handle events in the normal mode. For example, the lower priority tasks such as communications and temperature monitoring may be suspended during the transient power condition. Therefore, by utilizing the same controller 160 to process inputs and outputs during the normal mode as well as the transient mode (thereby providing the control), the requirement for allocating separate dedicated devices to handle various modes is eliminated, thereby reducing costs, reducing power requirement, reducing silicon area requirement, and improving converter efficiency. Additional details of the controller 160 and the detector circuit 150 are described with reference to FIG. 2.

Figure 2:
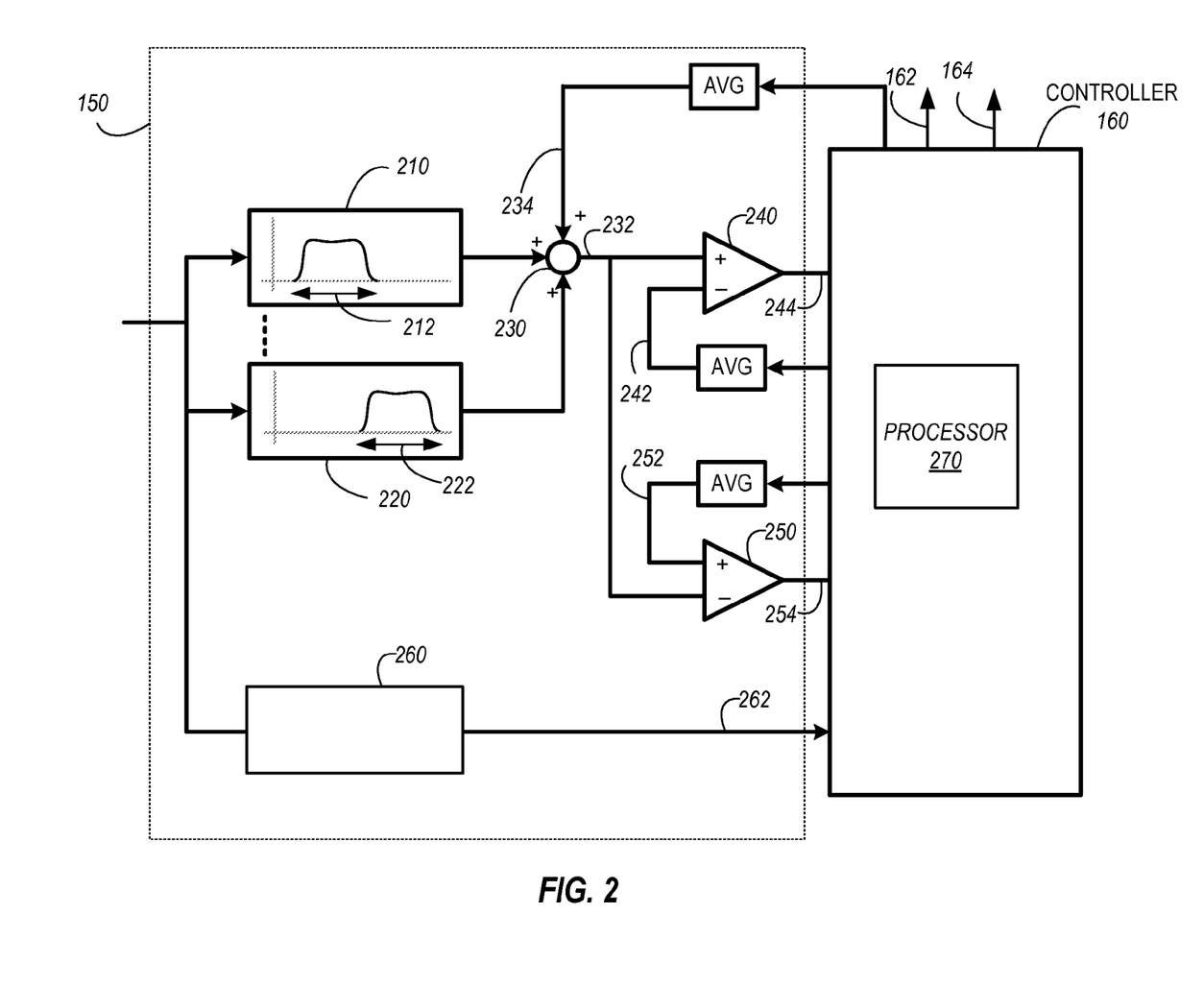
FIG. 2 is a block diagram illustrating a controller and a detector circuit included in a power conversion system described with reference to FIG. 1, in accordance with some embodiments.

FIG. 2 is a block diagram illustrating further details of a controller and a detector circuit included in a power conversion system described with reference to FIG. 1, in accordance with some embodiments.

In some embodiments, the detector circuit 150 may be configured to include one or more bandpass filters coupled to one or more comparators depending on the application and bandwidth requirements. In the depicted embodiment, the detector circuit 150 includes a first bandpass filter 210 coupled in parallel with a second bandpass filter 220. Each one of the first bandpass filter 210 and the second bandpass filter 220 is coupled to the output terminal 192 to receive a signal indicative of the power output parameter 198. The first bandpass filter 210 may be configured to pass a signal having a frequency between a configurable first frequency range 212 and the second bandpass filter 220 may be configured to pass a signal having a frequency between a configurable second frequency range 222, the configurable second frequency range 222 being disposed adjacent to the configurable first frequency range 212 (e.g., share one or more overlapping frequencies which lie towards the upper limit of the first frequency range 212 and the lower limit of the second frequency range 222). It is understood that at least one bandpass filter is desired to be included in the detector circuit 150. A specific number of bandpass filters included in the detector circuit 150 may depend upon factors such as analog component value selection limitations, the bandwidth requirements to handle the transient condition and others. A center frequency and bandwidth calculation may be performed for each bandpass filter to ensure the controller 160 and the detector circuit 150 combined provide the overall bandwidth for handling the transient power condition.

In some embodiments, each of the output the first bandpass filter 210 and the second bandpass filter 220 may be combined with a Vref 234 input (used as a set point) in a summation node 230 to generate an output 232 provided to a first comparator 240 and a second comparator 250. The Vref 234 input may be generated as a scaled and averaged value of the power output parameter 198 provided by the controller 160. In addition, the Vref 234 input may be generated using digital circuit, analog circuit or a combination thereof. The detector circuit 150 may include a current estimator circuit 260 coupled to the output terminal 192 to receive the signal indicative of the power output parameter 198 for estimating an output current 262. The current estimator circuit 260 may be included a scaling and averaging function to derive the output current from the power output parameter 198. The scaled and averaged value of the output current 262 is provided to the controller 160. The controller 160 may perform an analog-to-digital conversion (A/D) on the scaled and averaged value of the output current 262 for use in controlling the power output parameter 198.

It is understood that at least one comparator is desired to be included in the detector circuit 150. A specific number of comparators included in the detector circuit 150 may depend upon factors such as degrees of control desired. For example, in the depicted embodiment, two comparators may be included to determine a positive or negative slope of the power output parameter 198. That is, determine whether the change in load current is positive or negative.

In some embodiments, the first comparator 240 compares a first reference value 242 to the output 232 of the summation node 230 to determine whether a first interrupt 244 is asserted or deasserted, the assertion of the first interrupt 244 being indicative of the transient power condition. Thus, the first reference value 242 is configurable as the threshold value to generate the first interrupt 244. In an embodiment, a slew rate (may be positive or negative) of the output 232, which is indicative of a slew rate of the power output parameter 198, may be compared to a threshold to determine the transient power condition and assert the first interrupt 244. Similarly, if configured the second comparator 250 compares a second reference value 252 to the output 232 of the summation node 230 to determine whether a second interrupt 254 is asserted or deasserted, the assertion of the second interrupt 254 being indicative of the transient power condition. Thus, the second reference value 252 is configurable as the threshold value to generate the second interrupt 254. In an embodiment, a slew rate (may be positive or negative) of the output 232, which is indicative of a slew rate of the power output parameter 198, may be compared to a threshold to determine the transient power condition and assert the second interrupt 254. The first reference value 242 and the second reference value 252 may be averaged based on a pulse width modulator output value (e.g., based on control signals 162, 164) provided by the controller 160.

In some embodiments, the controller 160 includes a processor 270 configured to execute one or more logic instructions to perform control of the power conversion system 100. The processor 270, which may be configured to operate in the normal, transient condition mode, and others, may be coupled to the following inputs and outputs to perform the control functions: the output current 262 received from the current estimator circuit 260 as an input, the first interrupt 244 and the second interrupt 254 as inputs, the control signals 162, 164 as an output (e.g., PWM output) to control a pulse width of the input signal received across terminal 112 and terminal 194. The control signals 162, 164 may also be used to derive the first reference value 242 and the second reference value 252 for the comparators 240 and 250.

In some embodiments, the processor 270 while operating in the normal mode may receive at least one interrupt signal in response to the transient power condition detected by the detector circuit 160, e.g., by the detector circuit 160 asserting one of the first interrupt 244 or the second interrupt 254. In response to the interrupt, the processor 270 is switched to operate in the transient power mode from the normal mode, thereby enabling the processor 270 to allocate greater processing resources to process the power output parameter 198 associated with the transient power condition compared to resources allocated by the processor 270 operating in the normal mode to process the power output parameter 198.

In some embodiments, another interrupt (may be received via the same signal path as the first interrupt 244 or the second interrupt 254) is received by the processor 270 indicative of an absence of the transient power condition. For example, when the value of the power output parameter 198 returns to a threshold limit (e.g., 0.5 volts) compared to the set point value then it may be determined that the transient power condition does not exist. In response to receiving this interrupt, the processor 270 is switched to operate in the normal mode from the transient power mode. To facilitate a smooth transfer between the modes, the processor 270 adjusts the proportional gain value (e.g., 75 to 5) so that the value of the power output parameter 198 does not experience a discontinuity. In addition, the reduction in gain may be desired to maintain stability when normal operating mode is reasserted and the sampling frequency is decreased from 100 kHz to 10 kHz.

In some embodiments, the allocation of greater processing resources by the process 270 may include the following: modifying a frequency of processing the power output parameter 198 from the first frequency to a second frequency, suspending the execution of non-critical tasks (or tasks having lower priority compared to a threshold) such as communications and temperature monitoring tasks, and suspending execution of digital closed loop control, e.g., PID control by linear adjustment of PWM. The processor 270 determines whether an interrupt received is the first interrupt 244 or the second interrupt 254 and adjusts the control signals 162, 164 in a binary manner to a logic high or logic low accordingly. That is, the control signals 162, 164 may be asserted or deasserted in a non-linear manner at each scan (occurring at the second frequency). The control signals 162, 164 may be asserted or deasserted until another interrupt is received by the processor 270 indicative of an absence of the transient power condition. In some embodiments, the elements 240, 254 may be duplicated for improved performance during a transient. In addition, the duplicated circuitry for generating the interrupt signals may be used in conjunction with elements 240, 254 for improved transient performance.

Figure 3A:
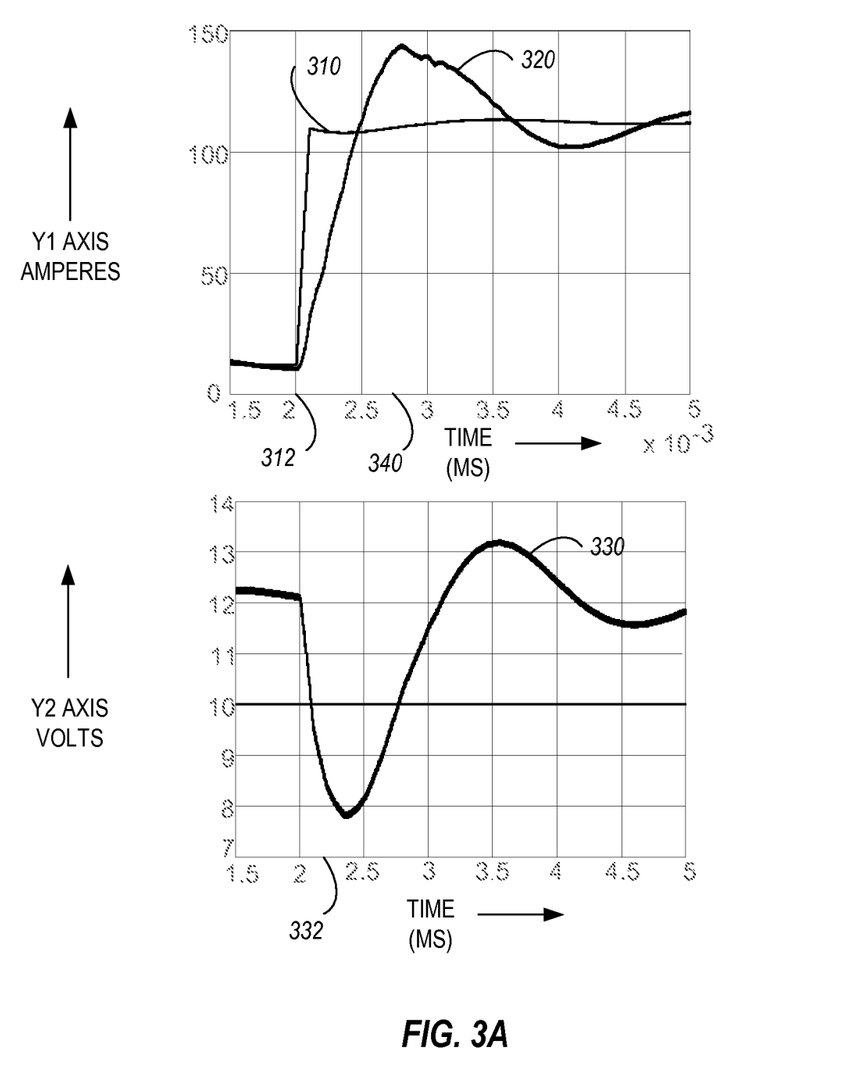
FIG. 3A illustrates in graphical form an output current and voltage waveform for a traditional digitally controlled power converter, in accordance with some embodiments.

FIG. 3A illustrates in graphical form an output current and voltage waveform for a traditional digitally controlled power converter.

As described herein, a traditional digitally controlled power converter may not include a processor that switches from a second operating mode to a first operating mode in response to receiving an interrupt signal that is indicative of a transient power condition. A transient power condition occurs in the traditional digitally controlled power converter at time t0 312 when a load current (illustrated by graph 310) jumps from about 12 amperes to about 112 amperes within a fraction of a millisecond (e.g., 100 microseconds). Y1-axis shows current in amperes, Y2-axis shows output voltage in volts, and X-axis shows time in milliseconds. The inductor current (illustrated by graph 320) overshoots to about 140 amperes as the traditional digitally controlled power converter attempts to supply the required increase within several milliseconds at time t3 340. The output voltage (illustrated by graph 330) drops by more than 30% (e.g., from a set point of 12 volts to about 8 volts at time t2 332. After an initial overshoot to above 13 volts, the traditional digitally controlled power converter attempts to stabilize the output voltage to 12 volts within several milliseconds. Therefore, the traditional digitally controlled power converter may not be able to meet the desired power specifications in hybrid transportation applications, especially during transient power conditions.

Figure 3B:
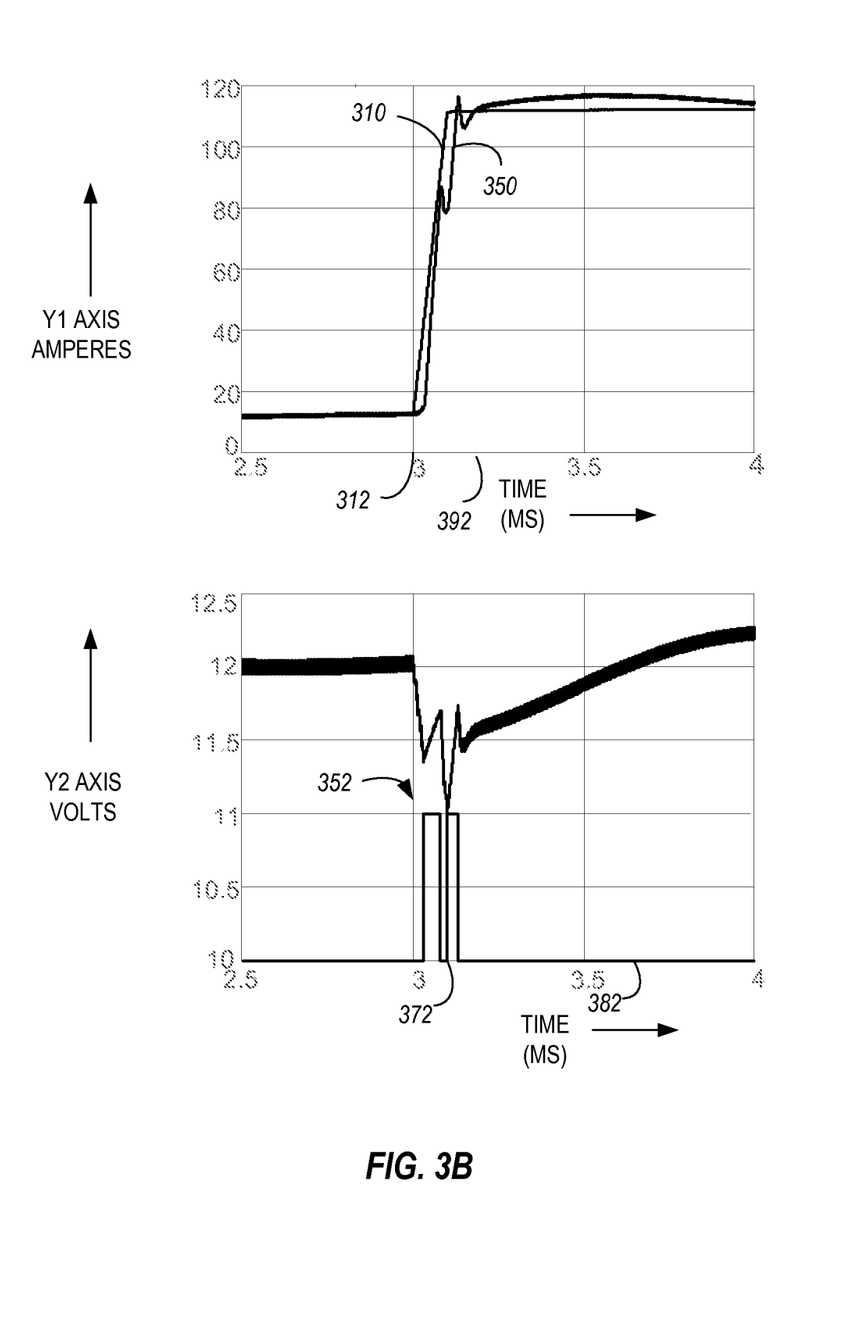
FIG. 3B illustrates in graphical form an output current and power output parameter waveform for a power conversion system described with reference to FIGS. 1 and 2, in accordance with some embodiments.

FIG. 3B illustrates in graphical form an output current and power output parameter waveform for a power conversion system described with reference to FIGS. 1 and 2, in accordance with some embodiments.

The data used to generate graphs and waveforms illustrated in FIGS. 3A and 3B may be computed using various techniques including use of circuit testing, empirical, simulation tools, and others. In some embodiments, a transient power condition occurs in the power conversion system 100 described with reference to FIG. 1 at time t0 312 when a load current (illustrated by graph 310) jumps from about 12 amperes to about 112 amperes within a fraction of a millisecond. An inductor current (illustrated by graph 350) slightly overshoots to about 115 amperes as the controller 160 changes its operating mode from normal to transient power condition, increases the sampling frequency, and increases the current supply to the required level within a fraction of a millisecond at time t7 392. The controller 160 asserts the control signals 162, 164 twice (illustrated by 2 PWM on/off pulses 352) to increase the power output parameter 198 in response to the detector circuit 160 determining that the power output parameter 198 is less than the set point of 12 volts, the decrease in voltage caused by the sudden jump in load current to 112 amperes. The value of the power output parameter 198 drops by about 8% (e.g., from a set point of 12 volts to about 11 volts, which is controlled within the allowable 10% power specification) at time t5 372. The controller 160 increases the value of the power output parameter 198 within a fraction of a millisecond (e.g., within 0.6 milliseconds) at time t6 382 to about 12 volts. Therefore, the power conversion system 100 that is configured to use the same controller 160 meets the desired power specifications in hybrid transportation applications during normal mode as well as during transient power conditions.

Figure 4A:
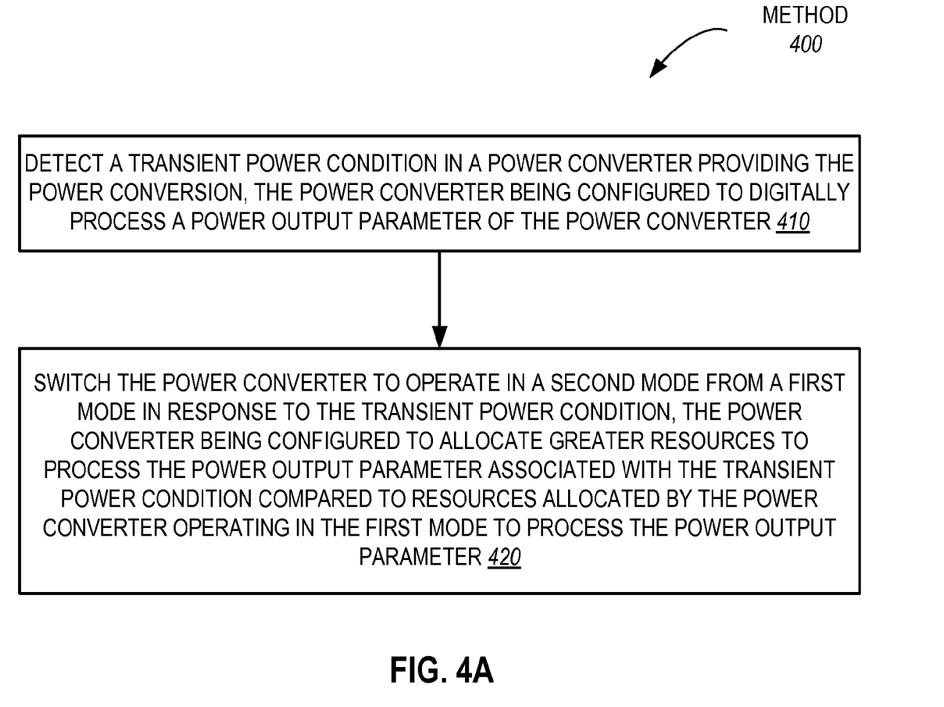
FIG. 4A is a flow diagram illustrating a method for power conversion, in accordance with some embodiments.

FIG. 4A is a flow diagram illustrating a method 400 for power conversion, in accordance with some embodiments. In some embodiments, the method 400 illustrated in FIG. 4A may be performed by one or more of the devices illustrated in FIG. 1, FIG. 2, and FIG. 3. At block 410, a transient power condition is detected in a power converter providing the power conversion, the power converter being configured to digitally process a power output parameter of the power converter. At block 420, the power converter is switched to operate in a second mode from a first mode in response to the transient power condition, the power converter being configured to allocate greater resources to process the power output parameter associated with the transient power condition compared to resources allocated by the power converter operating in the first mode to process the power output parameter.

Figure 4B:
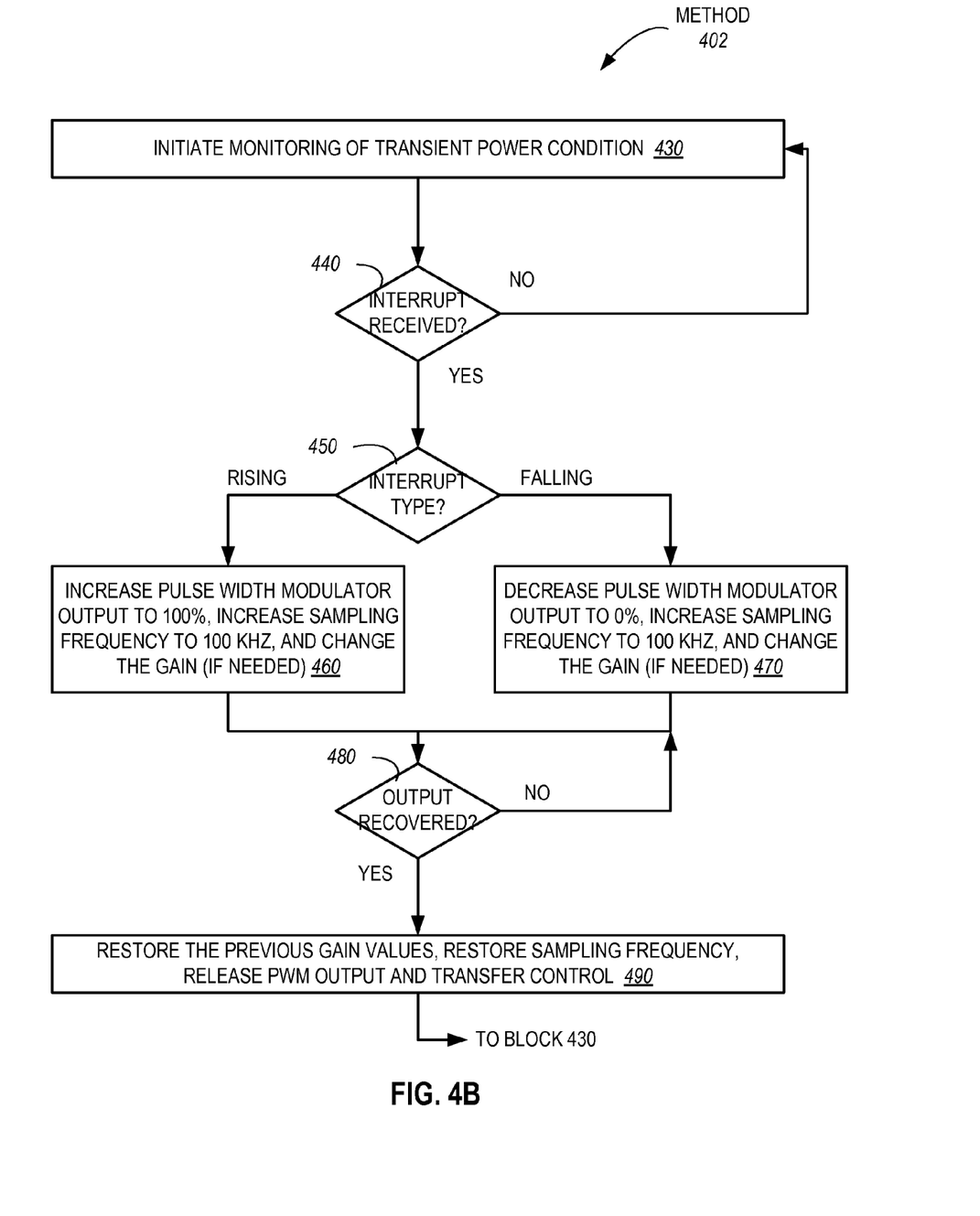
FIG. 4B is a flow diagram illustrating a method 402 for power conversion, in accordance with some embodiments.

FIG. 4B is a flow diagram illustrating a method 402 for power conversion, in accordance with some embodiments. In some embodiments, the method 402 illustrated in FIG. 4B may be performed by one or more of the devices illustrated in FIG. 1, FIG. 2, and FIG. 3. At block 430, monitoring of transient power condition is initiated. At block 440, a determination is made if an interrupt signal (indicative of the transient power condition) is received or not received. At block 450, in response to receiving an interrupt signal, a type of the interrupt signal (e.g., first interrupt 244 or second interrupt 254) is determined. At block 460, in response to determining a rising edge (e.g., positive slew rate), the pulse width modulator output is increased to 100%, sampling frequency is increased to 100 KHz, and the gain changed (if needed). At block 470, in response to determining a non-rising edge (e.g., negative slew rate), the pulse width modulator output is decreased to 0%, sampling frequency is increased to 100 KHz, and the gain changed (if needed). At block 480, a determination is made whether the output voltage is recovered within desired limit. At block 482, in response to determining the output voltage is not recovered within desired limits, control is transferred to block 480. At block 490, in response to determining that the output voltage is recovered within the desired limit, the previous gain values are restored, sampling frequency is restored to 10 kHz, PWM output is released from 0% or 100% and control is transferred back to block 410.

Figure 5:
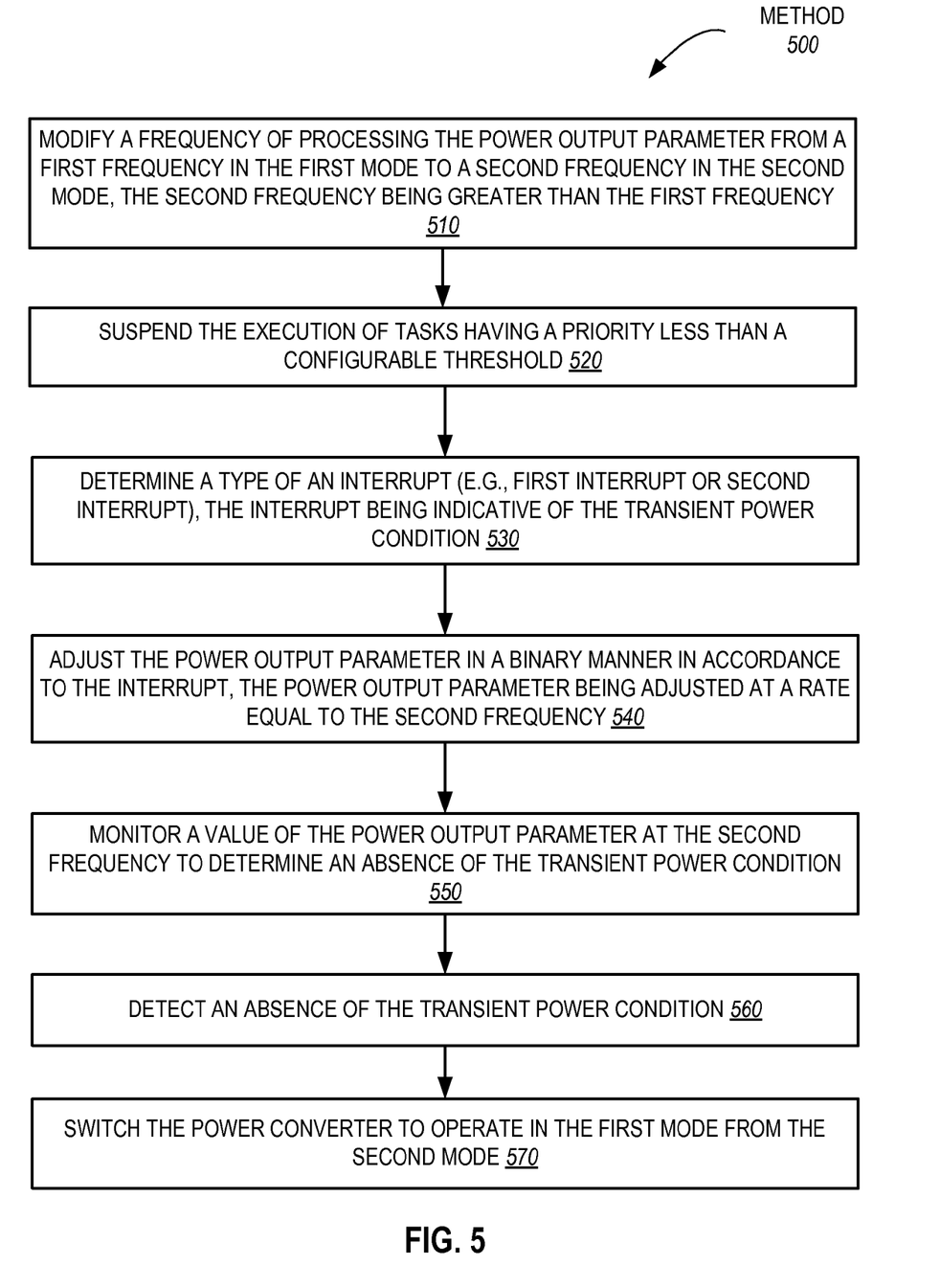
FIG. 5 is a flow diagram illustrating a method for switching a power converter described with reference to FIG. 4, in accordance with some embodiments.

FIG. 5 is a flow diagram illustrating a method 500 for switching a power converter described with reference to FIG. 4A, in accordance with some embodiments. In some embodiments, the method 500 illustrated in FIG. 5 may be used to implement block 420 described with reference to FIG. 4A.

At block 510, a frequency of processing the power output parameter is modified from a first frequency in the first mode to a second frequency in the second mode, the second frequency being greater than the first frequency. At block 520, the execution of tasks having a priority less than a configurable threshold is suspended. At block 530, a type of an interrupt (e.g., first interrupt or second interrupt) is determined, the interrupt being indicative of the transient power condition. At block 540, the power output parameter is adjusted in a binary manner in accordance to the interrupt, the power output parameter being adjusted at a rate equal to the second frequency. At block 550, a value of the power output parameter is monitored at the second frequency to determine an absence of the transient power condition. At block 560, an absence of the transient power condition is detected. At block 570, in response to detecting the absence of the transient power condition, the power converter is switched to operate in the first mode from the second mode.

It is understood, that various processes described above with reference to the methods 400 and 500 may be added, omitted, combined, altered, or performed in different order. For example, with reference to the method 400, a block may be added after the block 420 to go back to the block 410 if the transient power condition is not detected.

Figure 6:
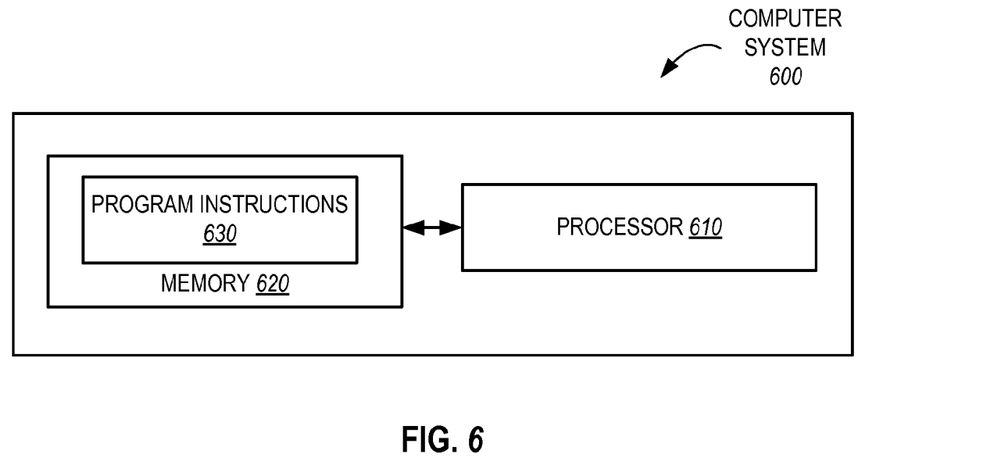
FIG. 6 is a block diagram illustrating a computer system, in accordance with some embodiments.

FIG. 6 illustrates a block diagram of a computer system 600, in accordance with some embodiments. The computer system 600 includes a processor 610 coupled to a memory 620. The memory 620 is operable to store program instructions 630 that are executable by the processor 610 to perform one or more functions. It should be understood that the term "computer system" is intended to encompass any device having a processor that is capable of executing program instructions from a memory medium. In a particular embodiment, the various functions, processes, methods 400 and 500, and one or more devices of the power conversion system 100 described herein may be implemented using the computer system 600. For example, the controller 160 may be implemented using one or more of the computer system 600.

The various devices, functions, processes, methods, and operations performed or executed by the system 600 can be implemented as the program instructions 630 (also referred to as software or simply programs) that are executable by the processor 610 and various types of computer processors, controllers, microcontrollers, central processing units, microprocessors, digital signal processors, state machines, programmable logic arrays, and the like. In an exemplary, non-depicted embodiment, the computer system 600 may be networked (using wired or wireless networks) with other computer systems.

In various embodiments the program instructions 630 may be implemented in various ways, including procedure-based techniques, component-based techniques, object-oriented techniques, rule-based techniques, among others. The program instructions 630 can be stored on the memory 620 or any computer-readable medium for use by or in connection with any computer-related system or method. A computer-readable medium is an electronic, magnetic, optical, or other physical device or means that can contain or store computer program logic instructions for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

Those of skill will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. An apparatus comprising:
   a processor configured to control a DC-to-DC power converter; and
   logic instructions on tangible computer readable media and executable by the processor to cause the processor to perform:
      receiving at least one interrupt indicative of a transient power condition of the DC-to-DC power converter;
      switching the processor to operate in a second mode from a first mode responsive to the interrupt, the switching enabling the processor to allocate greater resources to process an operating parameter of the DC-to-DC power converter operating in the transient power condition compared to resources allocated by the processor operating in the first mode to process the operating parameter.

2. The apparatus of claim 1, where the interrupt is generated by a detector circuit coupled to receive the operating parameter, the detector circuit comprising:
   a first bandpass filter configured to pass a signal having a frequency between a configurable first frequency range, the signal representing the operating parameter;
   a first comparator coupled to the first bandpass filter, the first generator being operable to generate a first interrupt in response to the operating parameter being greater than a first reference value, the first reference value being provided by the processor; and
   a second comparator coupled to the first bandpass filter, the second comparator being operable to generate a second interrupt in response to the operating parameter being less than a second reference value, the second reference value being provided by the processor.

3. The apparatus of claim 2, where the detector circuit further comprising:
   a second bandpass filter configured to pass the signal having the frequency between a configurable second frequency range adjacent to the first frequency range.

4. The apparatus of claim 2, where the allocation of the greater resources further comprising logic instructions on the tangible computer readable media and executable by the processor to cause the processor to perform:
   modifying a frequency of processing the operating parameter by the processor from a first frequency in the first mode to a second frequency in the second mode, the second frequency being greater than the first frequency;
   suspending non-critical tasks and suspending execution of digital closed loop control;
   determining whether the at least one interrupt is the first interrupt or the second interrupt; adjusting the operating parameter in a binary manner in accordance to the at least one interrupt, the operating parameter being adjusted at the second frequency; and
   monitoring a value of the operating parameter at the second frequency to determine an absence of the transient power condition.

5. The apparatus of claim 2, where the detector circuit further comprises:
   a current estimator circuit coupled to receive a signal indicative of the operating parameter and provide a scaled average analog value of the operating parameter to the processor, the processor being configured to convert the analog value to a digital equivalent.

6. The apparatus of claim 2, where a lower frequency of the first frequency range is disposed to overlap a 3 dB frequency of the processor operating in the first mode, thereby providing a bandwidth extension to the processor operating in the second mode.

7. The apparatus of claim 2, where the processor, the logic instructions, the power converter, and the detector circuit are configured to provide power to an electric motor used in a vehicle.

8. The apparatus of claim 1, where the operating parameter is at least one of voltage, current, phase, and frequency measurement.

9. The apparatus of claim 1, where the processor is configured to maintain a value of the operating parameter within a configurable tolerance independent of the processor operating in the second mode and the first mode.

10. The apparatus of claim 1, where a slew rate of the operating parameter triggering the at least one interrupt exceeds a bandwidth of the processor operating in the first mode and is within the bandwidth of the processor operating in the second mode.

11. A method for power conversion, the method comprising:
   detecting a transient power condition in a DC-to-DC power converter providing the power conversion, the DC-to-DC power converter being configured to digitally process an operating parameter of the power converter;
   switching the DC-to-DC power converter to operate in a second mode from a first mode in response to the transient power condition, the DC-to-DC power converter being configured to allocate greater resources to process the operating parameter associated with the transient power condition compared to resources allocated by the DC-to-DC power converter operating in the first mode to process the operating parameter;
   modifying a frequency of processing the operating parameter from a first frequency in the first mode to a second frequency in the second mode, the second frequency being greater than the first frequency;
   suspending execution of tasks having a priority less than a configurable threshold;
   determining a type of an interrupt, the interrupt being indicative of the transient power condition;
   adjusting the operating parameter in a binary manner in accordance to the interrupt, the operating parameter being adjusted at a rate equal to the second frequency; and
   monitoring a value of the operating parameter at the second frequency to determine an absence of the transient power condition.

12. The method of claim 11, further comprising:
detecting an absence of the transient power condition; and
switching the power converter to operate in the first mode.

13. The method of claim 11, where the detecting comprises: determining whether a slew rate of the operating parameter is greater than a configurable threshold.

14. A method for power conversion, the method comprising:
detecting a transient power condition in a DC-to-DC power converter providing the power conversion, the DC-to-DC power converter being configured to digitally process an operating parameter of the power converter;
switching the DC-to-DC power converter to operate in a second mode from a first mode in response to the transient power condition, the DC-to-DC power converter being configured to allocate greater resources to process the operating parameter associated with the transient power condition compared to resources allocated by the DC-to-DC power converter operating in the first mode to process the operating parameter;
filtering a signal having a frequency between a configurable first frequency range, the signal representing the operating parameter;
comparing the signal to a first reference value to detect the transient power condition in response to the signal being greater than the first reference value, the first reference value being provided by the power converter;
comparing the signal to second reference value to detect the transient power condition in response to the signal being less than a second reference value, the second reference value being provided by the power converter.

15. A computer program product for power conversion, the computer program product embodied on a computer operable media, the computer program product comprising logic instructions effective to cause:
detecting a transient power condition in a DC-to-DC power converter providing the power conversion by digitally controlling an operating parameter of the power converter;
switching the DC-to-DC power converter to operate in a second mode from a first mode in response to the transient power condition, thereby allocating greater resources to control the operating parameter associated with the transient power condition compared to resources allocated in the first mode to control the operating parameter;
modifying a frequency of processing the operating parameter from a first frequency in the first mode to a second frequency in the second mode, the second frequency being greater than the first frequency;
suspending execution of tasks having a priority less than a configurable threshold;
detecting a type of an interrupt, the interrupt being indicative of the transient power condition;
adjusting the operating parameter in a binary manner in accordance to the interrupt, the operating parameter being adjusted at a rate equal to the second frequency; and
monitoring a value of the operating parameter at the second frequency to determine an absence of the transient power condition.

16. The computer program product of claim 15, further comprising logic instructions effective to cause:
detecting an absence of the transient power condition; and
switching the power converter to operate in the first mode.

17. The computer program product of claim 15, further comprising logic instructions effective to cause:
determining whether a slew rate of the operating parameter is greater than a configurable threshold.

18. A computer program product for power conversion, the computer program product embodied on a computer operable media, the computer program product comprising logic instructions effective to cause:
detecting a transient power condition in a DC-to-DC power converter providing the power conversion by digitally controlling an operating parameter of the power converter;
switching the DC-to-DC power converter to operate in a second mode from a first mode in response to the transient power condition, thereby allocating greater resources to control the operating parameter associated with the transient power condition compared to resources allocated in the first mode to control the operating parameter;
filtering a signal having a frequency between a configurable first frequency range, the signal representing the operating parameter;
comparing the signal to a first reference value to detect the transient power condition in response to the signal being greater than the first reference value, the first reference value being provided by the DC-to-DC power converter; and
comparing the signal to second reference value to detect the transient power condition in response to the signal being less than a second reference value, the second reference value being provided by the DC-to-DC power converter.

* * * * *